April 5, 1927.
L. W. AMENDE
1,623,081
SHOCK ABSORBER
Filed June 18, 1925
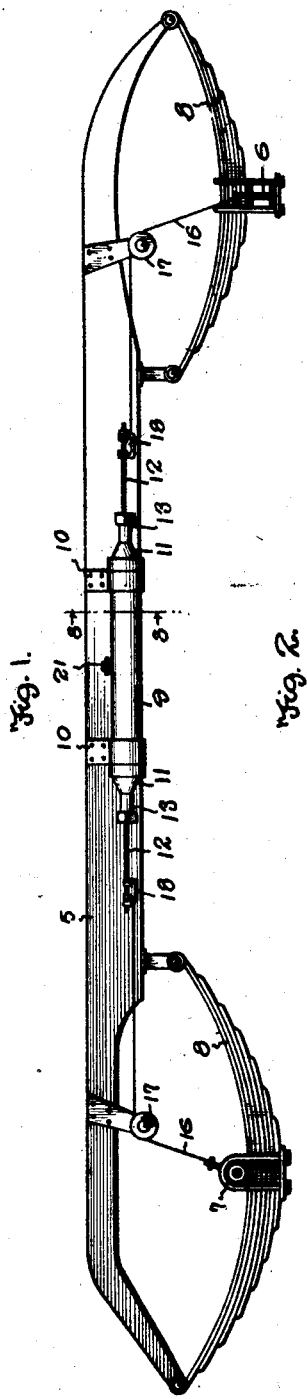
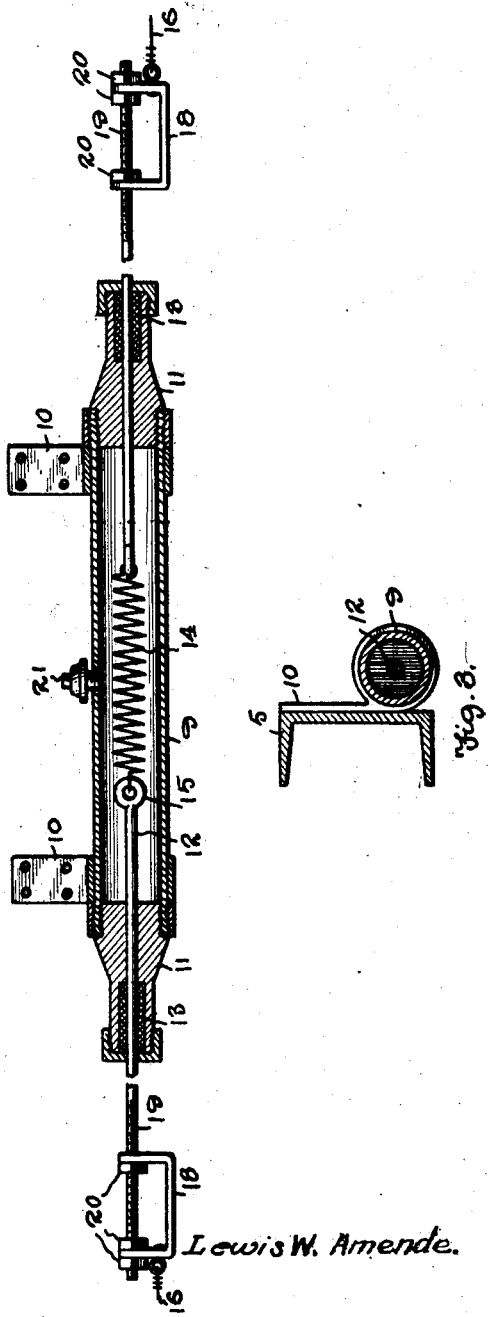
Lewis W. Amende. Inventor Patented Apr. 5, 1927.

1,623,081

UNITED STATES PATENT OFFICE.

LEWIS W. AMENDE, OF CASPER, WYOMING.

SHOCK ABSORBER.

Application filed June 18, 1925. Serial No. 38,094.

This invention relates to certain new and useful improvements in shock absorbers for motor vehicles, and has more particular reference to a device of this kind adapted to absorb the shocks of rebounding experienced with motor vehicles after striking irregularities in the surface of the road.

The primary object of the invention is to provide a device of the above kind which is extremely simple and durable in construction as well as efficient in operation.

Another object of the invention is to provide a shock absorber embodying a single device adapted to be positioned at each side of a motor vehicle and operatively connected to both axles thereof.

With the above general objects in view and others that will become apparent as the nature of the invention is better understood, the same consists in the novel form, combination and arrangement of parts hereinafter more fully described, shown in the accompanying drawing and claimed.

In the drawing, wherein like reference characters indicate corresponding parts throughout the several views, Figure 1 is a side elevational view illustrating a shock absorber constructed in accordance with the present invention and operatively associated with parts of a motor vehicle, Figure 2 is a longitudinal sectional view of the shock absorber with parts removed and parts broken away, the shock absorber being drawn on a slightly enlarged scale, and Figure 3 is an enlarged transverse sectional view taken substantially upon line 3—3 of Figure 1.

Referring more in detail to the drawing, 5 indicates the side rail of a motor vehicle frame or chassis and 6 and 7 respectively indicate the front and rear axles disposed beneath the ends of the frame rail 5 and yieldingly connected to the latter by means of the usual semi elliptic leaf springs or spring suspension devices 8.

The present invention embodies a cylinder 9 equipped with brackets 10 adapted to be secured to the intermediate portion of the side rail 5 so as to rigidly position the cylinder 9 in a substantially horizontal position substantially midway between the axles 6 and 7 as shown in Figure 1. This cylinder is substantially closed at its ends by means of members 11 which have axial openings through which rods 12 slidably extend, and these members 11 are provided at their outer ends with stuffing boxes 13. The cylinder 9 is adapted to be filled with oil which is prevented from leaking from the cylinder by means of the stuffing boxes 13, and the adjacent ends of the rods 12 are connected within the cylinder 9 by means of a helical tension spring 14. The inner ends of the rods 12 are preferably formed with eyes 15 adapted to be engaged by hooked ends of the spring 14 for facilitating connection of the spring to the said rods.

The rods 12 are thus disposed horizontally and extend longitudinally of the vehicle so as to respectively project toward the front and rear axles 6 and 7. The outer end of each rod is connected to one of the axles by means including a flexible member or cable 16, and each cable passes over a guide 17 fixed to the side rail 5 substantially directly above the associated axle. The guides 17 are preferably in the form of anti friction rollers as shown, and the flexible members 16 are attached to the axles in any well known or preferred manner.

The flexible members 16 are preferably connected to members 18 adjustable longitudinally on the rods 12 so as to permit shortening of the connections between the ends of the spring 14 and the axles 6 and 7 for taking up slack which will be produced through elongation of the spring 14 after constant use. The members 18 are preferably in the form of U-shaped straps having aligned apertures in the ends thereof through which the threaded outer end portions 19 of the rods 12 slidably extend, and a plurality of nuts 20 are threaded upon the portion 19 of each rod 12 for engagement with the legs of the U-shaped member 18 so as to releasably retain the latter in any desired adjusted position.

The cylinder 9 is equipped with any suitable form of device as at 21 for facilitating filling of said cylinder with oil or replenishing the supply therein as found necessary.

It is well known that when the wheels of a motor vehicle strike a bump or irregularity in the surface of the roadway the suspension springs 8 are flexed so that there is a relative movement of the axles 6 and 7 towards the frame rail 5, the springs 8 being thereby placed under considerable tension. What is known as a rebound then occurs involving separating movement between the axles and the frame rail 5, at which time the springs 8 return to and then flex past their normal form. This rebounding action causes considerable shock to the occupants of the vehicle, and the present device is designed to overcome excessive rebounding for reducing this shock. In performing this function the separating movement of the axles and the frame rail 5 produces a pull upon the flexible members 16 so as to separate the rods 12 and place the spring 14 under tension, the spring 14 also moving bodily in the cylinder 9 in case the rebound at one end of the frame is greater than at the other end thereof. The movement of the rods 12 and the spring 14 bodily in the cylinder 9 is resisted to some extent by the fluid within the cylinder for additionally resisting the rebounding action. The fluid employed is preferably in the nature of oil of a relatively heavy nature or of a thick pasty form so that it will resist the movement of the spring 14 as stated.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:

1. A shock absorber comprising a cylinder, rods slidably projecting through packing at the ends of the cylinder, a tension spring connecting the inner ends of the rods within the cylinder, means rigidly securing the cylinder to the frame of a vehicle between the axles thereof, means to operatively connect the outer ends of the rods respectively to the front and rear axles of the vehicle whereby separating movement between the axles and the vehicle frame will cause an outward pull upon the rods, and means for facilitating introduction of oil into the cylinder.

2. In combination with a vehicle frame and front and rear axles connected to the frame by means of suspension springs, a cylinder rigidly attached to the frame between the axle in a substantially horizontal position, a tension spring within the cylinder and movable longitudinally of the latter, means for facilitating introduction of oil within the cylinder, and operative air tight connection between each end of said spring and one of the axles, said operative connections being adjustable in length.

3. In combination with a vehicle frame and front and rear axles connected to the frame by means of suspension springs, a cylinder rigidly attached to the frame between the axle in a substantially horizontal position, a tension spring within the cylinder and movable longitudinally of the latter, means for facilitating introduction of fluid within the cylinder, and operative connections between each end of said spring and one of the axles, said operative connections being adjustable in length, and embodying flexible members, and guides carried by the frame around which said flexible members pass.

4. In combination with a vehicle frame and front and rear axles connected to the frame by means of suspension springs, a cylinder rigidly attached to the frame between the axle in a substantially horizontal position, a tension spring within the cylinder and movable longitudinally of the latter, means for facilitating introduction of fluid within the cylinder, and operative connection between each end of said spring and one of the axles, said operative connections being adjustable in length, and embodying flexible members, and guides carried by the frame around which said flexible members pass, said operative connections further embodying rods axially slidable through packing at the ends of the cylinder and having their adjacent ends connected by said tension spring, and members adjustable longitudinally of the outer ends of the rods and having ends of the flexible members attached thereto.

In testimony whereof I affix my signature.

LEWIS W. AMENDE.